(12) United States Patent
Yoon et al.

(10) Patent No.: US 11,112,546 B2
(45) Date of Patent: Sep. 7, 2021

(54) METHOD FOR PREPARING COATING LAYER HAVING HIGHLY ALIGNED NANOMATERIAL IN LYOTROPIC LIQUID CRYSTAL MATRIX

(71) Applicant: Korea Advanced Institute of Science and Technology, Daejeon (KR)

(72) Inventors: Dong Ki Yoon, Daejeon (KR); Yun Jeong Cha, Daejeon (KR); Soon Mo Park, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 235 days.

(21) Appl. No.: 16/100,171

(22) Filed: Aug. 9, 2018

(65) Prior Publication Data

US 2019/0056545 A1 Feb. 21, 2019

(30) Foreign Application Priority Data

Aug. 18, 2017 (KR) .......................... 10-2017-0104741
Apr. 11, 2018 (KR) .......................... 10-2018-0042043

(51) Int. Cl.
*G02B 5/24* (2006.01)
*C09K 19/38* (2006.01)
(Continued)

(52) U.S. Cl.
CPC ................ *G02B 5/24* (2013.01); *C09K 19/02* (2013.01); *C09K 19/389* (2013.01); *G02B 5/008* (2013.01); *G02B 5/22* (2013.01); *B82Y 20/00* (2013.01); *B82Y 40/00* (2013.01); *C09K 2019/521* (2013.01); *G02B 2207/101* (2013.01)

(58) Field of Classification Search
CPC .......... G02B 5/24; C09K 19/02; B82Y 40/00
See application file for complete search history.

(56) References Cited

U.S. PATENT DOCUMENTS 8,704,977 B2 * 4/2014 Lavrentovich ......... C09K 19/60
349/84
2016/0187700 A1 * 6/2016 Engel .................... G02F 1/1303
349/182

FOREIGN PATENT DOCUMENTS

JP 2002-294239 B2 10/2002
JP 2007231127 A 9/2007
(Continued)

OTHER PUBLICATIONS

Liu, Switchable Polarization-Sensitive Surface Plasmon Resonance of Highly Stable Gold Nanorods-Liquid Crystals Compostes, SPIE-OSA-IEEE, vol. 8308, 2011, p. 1-6 (Year: 2011).*
(Continued)

*Primary Examiner* — Tabatha L Penny
(74) *Attorney, Agent, or Firm* — Hultquist, PLLC; Steven J. Hultquist (57) ABSTRACT

A method is described for preparing a coating layer having highly aligned nanomaterial by applying shearing force to a composite of nano material and lyotropic liquid crystal material after mixing the nano material and the lyotropic liquid crystal material. The method includes (a) injecting a composite of nanomaterial and lyotropic liquid crystal into a space between an upper plate and a lower plate in a laminate; and (b) applying a shearing force to the composite of nanomaterial and lyotropic liquid crystal.

3 Claims, 4 Drawing Sheets
(4 of 4 Drawing Sheet(s) Filed in Color)

(51) Int. Cl.
*G02B 5/22* (2006.01)
*C09K 19/02* (2006.01)
*G02B 5/00* (2006.01)
*B82Y 20/00* (2011.01)
*B82Y 40/00* (2011.01)
*C09K 19/52* (2006.01)

(56) References Cited

FOREIGN PATENT DOCUMENTS

| JP | 2009139825 A | 6/2009 |
|---|---|---|
| KR | 100673367 B1 | 1/2007 |
| KR | 20100108580 A | 10/2010 |
| KR | 20140026291 A | 3/2014 |
| KR | 101683777 B1 | 12/2016 |
| KR | 101769011 B1 | 8/2017 |
| KR | 1001769011 B1 | 8/2017 |

OTHER PUBLICATIONS

Lee, Shearing and Electro-optical Properties of Stressed Cholesteric Liquid Crystal Cells, Journal of Information Display, vol. 11, No. 2, Jun. 2010, p. 91-93 (Year: 2010).*

Schymura, Macroscopic-scale carbon nanotube alignment via self-assembly in lytropic liquid crystals, Synthetic Metals, vol. 159, Issues 21-22, Nov. 2009, p. 2177-2179 (Year: 2009).*

Muller, Director dynamics of uniformly aligned nematic liquid crystals in transient shear flow, Rheol Acta, vol. 33 No. 6, 1994, p. 473-484 (Year: 1994).*

Zhang, Stressed Liquid Crystals: Properties and Applications, Kent State University, Aug. 2007, p. 1-267 (Year: 2007).*

"May 3, 2011 Office Action in U.S. Appl. No. 11/305,647, issued by Brian M. Gulledge".

Correa-Duarte, M., et al., "Linear Assemblies of Silica-Coated Gold Nanoparticles Using Carbon Nanotubes as Templates", "Adv. Mater.", Dec. 17, 2004, vol. 16, No. 23-24, Publisher: http://www.advmat.de.

Nikoobakht, Z., et al., "Self-Assembly of Gold Nanorods", "J. Phys. Chem.", Aug. 10, 2000, pp. 8635-8640, vol. 104, No. B2000.

Sudeep, P., et al., "Selective Detection of Cysteine and Glutathione Using Gold Nanorods", "J. Am. Chem. Soc.", 2005, pp. 6516-6517, vol. 127, Publisher: JACS Communications.

Zhao, N., et al., "Close-Packed Superlattices of Side-by-Side Assembled Au—CdSe Nanorods", "American Chemical Society", Jul. 28, 2009, pp. 3077-3081, vol. 9, No. 8, Publisher: Nano Letters.

Dierking, I., et al., "Aligning and Reorienting Carbon Nanotubes with Nematic Liquid Crystals", "Advanced Materials", 2004, pp. 865-869, vol. 16, No. 11.

* cited by examiner

Figure 1

GOLD NANOROD     DNA

METHOD FOR PREPARING COATING LAYER HAVING HIGHLY ALIGNED NANOMATERIAL IN LYOTROPIC LIQUID CRYSTAL MATRIX

CROSS-REFERENCE TO RELATED APPLICATIONS

The priority of Korean Patent Application 10-2017-0104741 filed Aug. 18, 2017 and the priority of Korean Patent Application 10-2018-0042043 filed Apr. 11, 2018 are hereby claimed under the provisions of 35 USC § 119. The disclosures of Korean Patent Application 10-2017-0104741 and Korean Patent Application 10-2018-0042043 are hereby incorporated herein by reference, in their respective entireties, for all purposes.

TECHNICAL FIELD

The present invention relates to a method for preparing coating layer having highly aligned nanomaterial in lyotropic liquid crystal matrix. More specifically, it relates to a method for preparing coating layer having highly aligned nanomaterial by applying shearing force to the composite of functional material and lyotropic liquid crystal material.

BACKGROUND ART

Plasmonic nanoparticles have been attracted in basic science, material science and applications of the same because of their unique optical and electrical properties such as surface plasmonic resonance (SPR). Specifically, a representative plasmonic nanoparticle is the gold nanorod (GNR), which shows polarization-dependent optical and electronic responses because of its anisotropic shape. This characteristic is advantageous compared with isotropic plasmonic nanoparticles, which can be used in numerous applications such as plasmonic sensing, biomedical technologies, metamaterials, nano-scale light polarizers and electro-optical devices. However, a key factor in these applications is the accurate orientation control of GNRs, as the resulting SPR property is strongly dependent on the anisotropy of arranged GNRs.

Therefore, many methods have been suggested for controlling the orientation of GNRs, in which physical interactions are generally used including electrostatic interactions (J. Am. Chem. Soc. 127: 6516, 2005), hydrogen bonding (Nano Lett. 9: 3077, 2009), solvent evaporation (J. Phys. Chem. B 104: 8635, 2000) and templating (Adv. Mater. 16: 2179, 2004). However, the ability to maximize the SPR property of GNRs or organize orientation of GNRs in large area remains limited.

In addition, JP 2002-294239 B2 suggests the method for anisotropically orienting nanorod-shape material stably-dispersed in lyotropic liquid crystal using shear stress by spreading. However, when shear stress by spreading is used, there is a limitation in controlling evaporating rate of solvent, which is the most important factor in orienting the lyotropic liquid crystal.

To overcome such limit, present inventors researched the method for orientation control of plasmonic nanoparticle using liquid crystal which can orient the nanorod by simple coating process and found that orientation of nanorod can be easily and accurately controlled when using lyotropic liquid crystal.

PRIOR ART REFERENCES

Patent

JP 2002-294239 B2

Non-Patent (1) Sudeep, P.; Joseph, S. S.; Thomas, K. G. *J. Am. Chem. Soc.* 2005, 127, 6516
(2) Zhao, N.; Lit, K.; Grenner, J.; Nie, Z.; Kumacheva, E. *Nano Lett.* 2009, 9 3077.
(3) Niloobakht, B.; Wang, Z.; El-sayed, M. *J. Phys. Chem. B* 2000, 104, 8635
(4) Correa.Duarte, M. A.; Sobal, N.; Liz.Marzan, L. M.; Giersig, M. *Adv. Mater.* 2004, 16, 2179.

DISCLOSURE OF INVENTION

Technical Problem

It is an object of the present invention to provide a method for preparing coating layer having highly aligned orientation of nanomaterial.

Another object of the present invention is to provide a plasmonic color filter with the coating layer prepared by the above method.

Yet another object of the present invention is to provide a method for controlling the orientation of nanomaterial easily and accurately.

Technical Solution

To achieve the above objects, the present invention provides a method for preparing a coating layer comprising the following steps:
(a) injecting composite of nanomaterial and lyotropic liquid crystal to space between the upper plate and lower plate laminated above and below;
(b) applying a shearing force to the composite of nanomaterial and lyotropic liquid crystal.

The present invention also provides a plasmonic color filter with a coating layer, in which the nanomaterials prepared by the method oriented perpendicular to the pulling direction.

The present invention also provides a plasmonic color filter with a coating layer, in which the nanomaterials prepared by the method are aligned parallel to the pulling direction.

The present invention also provides a plasmonic color filter with a coating layer in which the nanomaterials prepared by the method are alternately aligned in perpendicular and in parallel to the pulling direction.

The present invention also provides a method for preparing coating layer comprising the following steps:
(a) loading a composite of nanomaterial and lyotropic liquid crystal to a plate;
(b) applying a shearing force by scrubbing method sweeping the composite in one-axis using a brush.

The present invention also provides a plasmonic color filter coated with a coating layer in which the nanomaterials prepared by the preparing method are aligned in a zigzag form in a scrubbing direction.

The present invention also provides a method for controlling an orientation of nanomaterials by applying a shearing force to a composite of a nanomaterial and a lyotropic liquid crystal.

Effect of the Invention

The present invention has an advantage in that orientation of nanomaterials, which have a high industrial utilization but are difficult to control orientation, can be controlled very easily and simply by applying a shearing force using a mediator, such as a lyotropic liquid crystal matrix which is extractable from nature, cheap and biocompatible.

Specifically, the more a pulling speed of either an upper plate or a lower plate into one-axis increases, the more area of a surface of a solvent exposed to the air increases, thereby an evaporation rate of solvent increases. Thus, evaporation rate can be controlled accurately by a pulling speed.

In the present invention, orientation of a lyotopic liquid crystal can be controlled in various directions according to the control in pulling speed of a plate. Therefore, it has an advantage in preparing a thin film having domains with various orientations through a single process.

Further, the present invention can induce a highly aligned orientation of nanomaterials over a wide area, and can be applied to produce a plasmonic color filter film using the polarization dependent surface plasmonic resonance phenomenon of the oriented nanomaterials.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The nanomaterials in the thin film prepared by the scrubbing method using the fast shear speed are aligned in a zigzag form along the shear direction because undulations are formed at micro-level. As the water is evaporated, the zigzag-orientation of the DNA molecules formed on the thin film surface (e). If the thin film aligned in the zigzag form is observed by the polarizing microscope with the retardation plate, the yellow and blue stripes with several tens of micrometers appear continuously (f). If the extinction color of the gold nanorod-DNA thin film is confirmed, when the linear polarization direction and the shear direction are parallel to each other, the extinction color is green, and when the linear polarization direction and the shear direction are vertical to each other, the extinction color is red (g), because the orientation of the DNA and the gold nanorod is parallel to the shear direction as a whole. However, if the linear polarization direction is tilted at 45°, it is possible to observe the extinction color in which green and red alternately appear due to the zigzag domain of the gold nanorod-DNA (h).

DETAILED DESCRIPTION FOR CARRYING OUT THE DISCLOSURE

Unless differently defined, all the technical and scientific terms used in the present specification have the same meaning as understood by those skilled in the art to which the present invention pertains. Generally, the nomenclatures used in the present specification are well known in the present technical field and have been generally used.

So far, there have been many studies to control an alignment of nanorods using physical interaction, but there has been a limit in maximizing surface plasmonic resonance characteristics of the nanorods or in controlling the alignment of the nanorods in a large area.

In order to overcome these limitations, in the present invention, among liquid crystals which are sensitive to external stimuli such as an electric field or a magnetic field and easily oriented, the alignment of the nanorods is easily and simply controlled by using a lyotropic liquid crystal in which a liquid crystal phase appears depending on a concentration of a solute in a solvent. Because the lyotropic liquid crystal itself is dispersed in the solvent, it is easy to be homogeneously mixed with nanorods. Therefore, the alignment of nanorods can be controlled very effectively. Examples of the typical lyotropic liquid crystal matrix include DNA, cellulose, and collagen. Among those, DNA can be easily extracted from plants and animals and is very cheap, and an orientation of DNA can be easily controlled by applying a simple mechanical shearing or rubbing method. According to the exemplary embodiment of the present invention, DNA was used as a host-medium, and a gold nanorod was used as a guest-material.

Figure 1:
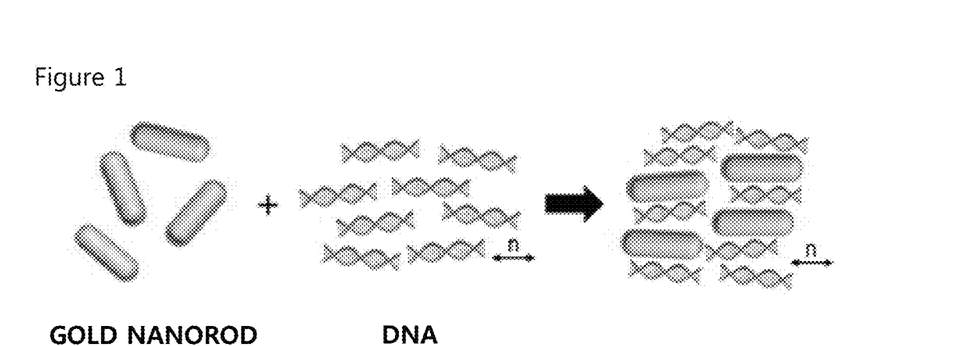
FIG. 1 is a schematic diagram showing a process of preparing a gold nanorod-DNA composite by mixing DNA, which is a typical lyotropic liquid crystal matrix, with a gold nanorod.

In order to prepare a highly aligned gold nanorod structure with DNA as a medium, it is necessary to mix an aqueous solution of the DNA having a liquid crystal phase with gold nanorod well. For this purpose, the gold nanorod surface was modified with poly (ethylene glycol) and then mixed. The prepared gold nanorod-DNA composite exhibits a behavior in the same direction as a general lyotropic liquid crystal, and a major axis of the gold nanorod is generally aligned parallel to a DNA chain (FIG. 1).

A thin film was prepared by dropping the prepared gold nanorod-DNA composite on a glass or silicon wafer plate, and then evaporating a solvent. The gold nanorod-DNA thin film formed by evaporation of the droplets has domains aligned in a small area due to the characteristics of a liquid crystal of DNA, but has a random alignment as a whole (FIG. 2, in (a) to (c)). However, by using a coating method by shear flow induction in which an upper plate and a lower plate are laminated, the composite is injected between the two plates, and then the upper plate is pulled in one-axis to apply a shearing force, the gold nanorod-DNA thin film aligned in a specific direction was be able to be prepared (FIG. 2, in (d) to (h)). This is a phenomenon that a capillary flow is generated to move gold nanorod-DNA molecules to the vicinity of a liquid-plate-air contact line for compensating for a loss of a solvent which occurs when the solvent is evaporated at the contact line which is exposed by pulling the plate during a shearing coating process. When the pulling speed of the upper plate is relatively slow (about 1 µm/s), since the shear flow by the pulling of the plate is limited, the gold nanorod and the DNA, which are concentrated in a limited space of a liquid-plate-air interface, are parallel with the contact line to minimize elastic energy and are oriented in a direction perpendicular to the pulling direction of the plate (FIG. 2, in (e), (f). On the other hand, when the pulling speed of the upper plate is relatively fast (about 10 µm/s), the gold nanorod and the DNA chain are aligned parallel to the pulling direction because the effect of the shearing force by the pulling of the plate is dominant (FIG. 2, in (g) and (h).

The orientation of the molecules in the gold nanorod-DNA thin films fabricated by evaporation of droplets or by shear coating with different shear speed was analyzed by a microscope and a spectrometer, respectively. The orientation of the DNA molecules was analyzed by a polarizing microscope in which a retardation plate ($\lambda$=530 nm) is inserted, with the polarizing microscope having two polarizers (polarizer and analyzer) orthogonal to each other. When the retardation plate is inserted, since a wavelength of retarded light is changed according to an angle between an optical axis of a sample and an optical axis of the retardation plate (slow axis), a direction of the molecular orientation can be confirmed by observing the sample while rotating the sample. For example, if a major-axis direction of DNA chain is parallel to the direction of the two polarizers, green light having a wavelength of 530 nm cannot transmit the analyzer, and the remaining blue and red light are mixed to be magenta. If the direction of the DNA chain coincides with or is orthogonal to the direction of the slow axis of the retardation plate (magenta arrows in FIG. 3, in (a), (e), (i), and FIG. 4, in (b) and (f)), light having a wavelength shorter or longer than that of 530 nm are retarded, so the sample becomes yellow (orange) or blue.

Figure 3:
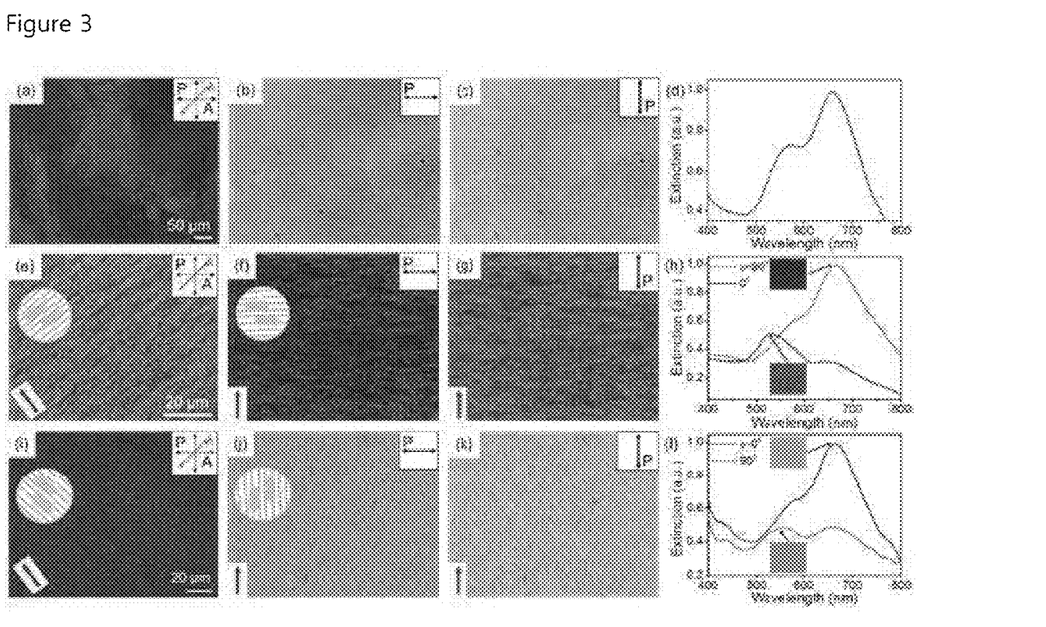
FIG. 3 is a diagrams and optical images obtained by analyzing the thin film of the gold nanorod-DNA composite, which is prepared by the evaporation of droplets and the shear coating method, by a microscope and a spectrometer. It may be confirmed based on the microscope image that the thin film formed by evaporating the droplets (a) has several domains in which gold nanorod-DNA molecules are randomly oriented (b, c). If a surface plasmonic resonance (SPR) spectrum of this thin film is analyzed by the spectrometer, a longitudinal SPR peak of the gold nanorod is observed at 660 nm and a transverse SPR peak is observed at 550 nm (d). If the thin film (e, i) formed by the shear coating method is observed by a polarizing microscope in which a retardation plate retarding light having a wavelength of 530 nm is inserted, it can be confirmed based on a color of a sample that the gold nanorod and the DNA are oriented in the direction perpendicular to a pulling direction when they are sheared at a slow speed (e), and the gold nanorod and the DNA are oriented in parallel when they are sheared at a fast speed (i). An extinction color of the thin film in a linear polarization direction is varied as follows: In the case of the thin film formed at the slow coating speed, when an angle φ formed by the linear polarization direction and the pulling direction is 90°, an extinction color is green (f), and when the angle is 0°, the extinction color is red (g), and the thin film formed at a fast coating speed has an opposite extinction color (j, k). The surface plasmonic resonance (SPR) spectrum shows the highest longitudinal peak when φ=90° and the highest transverse peak when φ=0° in the case of the thin film formed at the slow coating speed (h). The thin film formed at the fast coasting speed shows the opposite surface plasmonic resonance spectrum (i).

When a gold nanorod-DNA film formed by evaporation of droplets is observed based on the principle, a domain in which orange and blue colors are mixed can be seen (FIG. 3, in (a)), this means that the gold nanorod-DNA molecules have several domains aligned in a small area but have a random orientation as a whole. On the other hand, in the gold nanorod-DNA thin film which is subject to a shear coating at a slow speed or a fast speed, it was observed as uniform yellow (FIG. 3, in (e)) or blue (FIG. 3, in (f) by the polarizing microscope, respectively. It means that in the thin film formed at a slow shear speed, the DNA chain is aligned perpendicularly to the shear direction and in the thin film formed at a fast shear speed, the DNA chain is aligned parallel to the shear direction.

To confirm the alignment of the gold nanorods in the thin film, an extinction color of the thin film in a direction of linear polarization is observed by inserting only one polarizer into the microscope. When the major axis of the gold nanorod and the polarization direction of light coincide or perpendicular to each other, light having a wavelength of 660 nm is absorbed or light having a wavelength of 550 nm is absorbed, so the extinction color becomes green or red respectively. In the case of the gold nanorod-DNA thin film formed by evaporation of the droplet, although there is a change in the extinction color caused by the rotation of the polarizer, a composite with various colors was observed. This is because the gold nanorods were aligned in a small area like the DNA chain and had a random alignment as a whole (FIG. 3, in (b) and (c)). When the surface plasmonic resonance spectrum of this thin film is confirmed by a spectrometer, a longitudinal SPR peak of the gold nanorod is observed at 660 nm, a transverse SPR peak of the gold nanorod is observed at 550 nm, and the strength of each peak is not greatly when the direction of the linear polarization was changed (FIG. 3, in (d)). In the case of the gold nanorod-DNA thin film coated at a slow shear speed, a green color appears when the direction of the linear polarizer is perpendicular to the shear direction (FIG. 3, in (f)), a red color appears when the direction of the linear polarizer is parallel to the shear direction (FIG. 3, in (g)). This means that the gold nanorod is aligned perpendicularly to the shear direction like the DNA chain. In the plasmonic resonance spectrum of the gold nanorod-DNA thin films coated at a slow speed, the longitudinal SPR peak and the transverse SPR peak appear in a wavelength band similar to that of the gold nanorod-DNA thin film formed by evaporation of the droplets (FIG. 3, in (h)). When the angle between the linear polarization direction and the shear direction is 0°, the strength of the transverse SPR peak is strong, and when the angle is 90°, the strength of the longitudinal SPR peak becomes the maximum. However, the extinction color of the case of the gold nanorod-DNA thin film coated at a fast shear speed is opposite to that of the case of the thin film coated at a slow shear speed (FIG. 3, in (j) and (k)), which indicates that the gold nanorod is aligned parallel to the shear direction. In contrast to the thin film coated at a slow shear speed, in the plasmonic resonance spectrum of the gold nanorod-DNA thin film coated at a fast shear speed, when the angle between the linear polarization direction and the shear direction is 0°, the strength of the longitudinal SPR peak becomes maximum, and when the angle is 90°, the strength of the longitudinal SPR peak becomes minimum (FIG. 3, in (i)).

Figure 4:
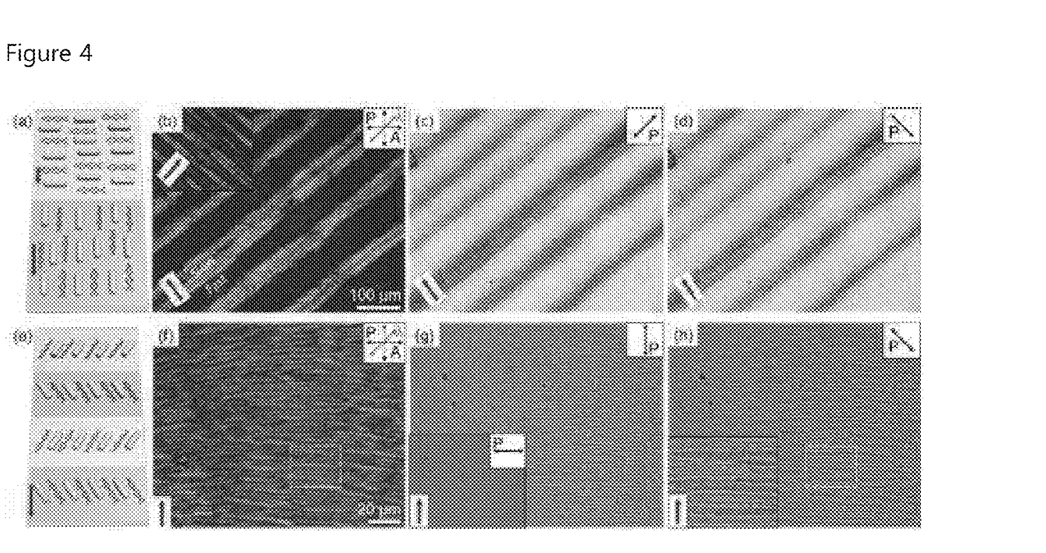
FIG. 4 is a schematic diagrams and optical images of the thin film in which the gold nanorod-DNA molecules are oriented in a direction orthogonal to each other by continuously changing the shear coating speed. When the shear direction is the top-down direction, a slow part is aligned perpendicularly to the shear direction and a fast part is aligned parallel to the shear direction, thus a thin film having an aligned orthogonal to each other according to the shear coating speed, which is schematically shown (a). When the orthogonally aligned thin film is observed by the polarizing microscope in which the retardation plate is inserted, yellow and blue stripes appear continuously due to the orthogonal orientation of the DNA molecules (b), when the thin film is rotated, the colors of each domain appear reversed (internal insertion diagram in b). If the extinction color of the gold nanorod-DNA thin film is confirmed when the linear polarization direction and the shear direction are perpendicular to each other (c) and parallel to each other (d), it can be confirmed that the orientation direction of the DNA and the gold nanorod are parallel to each other.

Based on these results, it is possible to form gold nanorod-DNA thin films orthogonal to each other by continuously changing the shear coating speed, slow and fast (FIG. 4, in (a)). Observing the thin film with a polarizing microscope in which the retardation plate is inserted, continuous yellow-blue stripes are observed when the shear direction of the sample and the optical axis of the retardation plate are orthogonal to each other. Herein, yellow stripe is shown when the molecular orientation of DNA is perpendicular to the shear direction and the blue stripe is shown when the molecular orientation is parallel to the shear direction (FIG. 4, in (b)). When the sample is rotated so that the shear direction of the sample and the optical axis direction of the retardation plate are parallel to each other, colors (yellow, blue) of each domain appears reversed (internal image in FIG. 4, in (b)). Observing the extinction color of the orthogonal thin film with the microscope in which only one polarizer is inserted, the extinction color of a part formed at a slow shear speed is green, the extinction color of a part formed at a fast shear speed is red (FIG. 4, in (c)) when the linear polarization direction is perpendicular to the shear direction, and the extinction color appears reversed when the polarizer is rotated parallel to the shear direction (FIG. 4, in (d)).

If a shearing force is applied using a brush rather than a flat plate, the gold nanorod-DNA thin film aligned in a zigzag form in a direction parallel to the shear direction of the brush may be formed (FIG. 4, in (e)). Observing the obtained thin film with a microscope with the retardation plate, continuous yellow-blue stripes having a micron level are observed when the shear direction of the sample and the analyzer are parallel to each other. Here, the yellow stripe shows the alignment in which the optical axis of the retardation plate is parallel to the DNA chain, and the blue stripe shows the vertically oriented molecular orientation (FIG. 4, in (f)). Observing the extinction color of the thin film in the zigzag form with the microscope in which only one polarizer is inserted, green is shown when the linear polarization direction is parallel to the shear direction (FIG. 4, in (g)), and red is shown when the linear polarization direction is perpendicular to the shear direction (internal image in FIG. 4, in (g)). When the polarizer is tilted diagonally in the shear direction, the continuous extinction colors of red and green colors appear (FIG. 4, in (h)).

Figure 5:
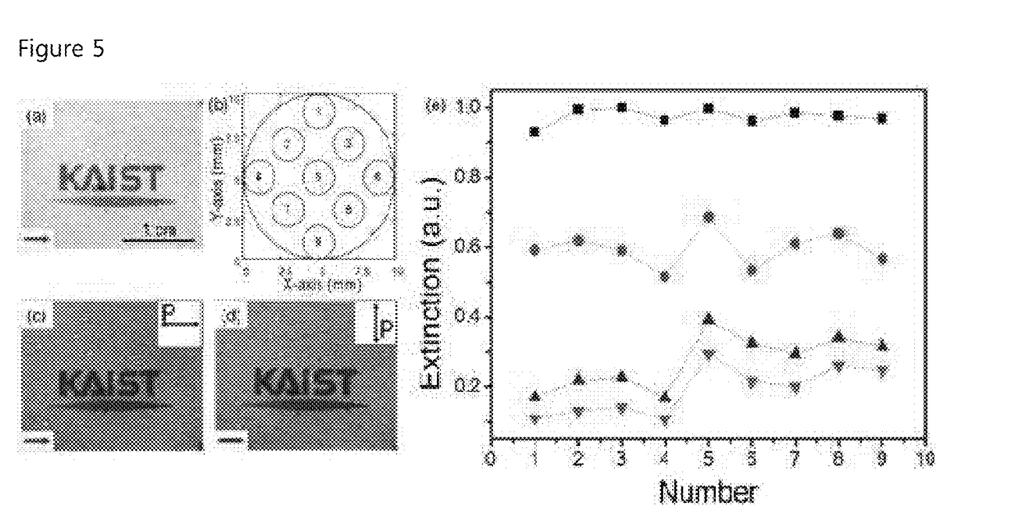
FIG. 5 is an images of the gold nanorod-DNA thin film aligned in a large area (a). The gold nanorod-DNA thin film aligned in a large area on the plate exhibit different extinction colors according to the direction of the polarizer (c, d). A graph shows each of the positions, at which the strength of the surface plasmonic resonance spectrum peak is measured in the thin film, on an x axis and a y axis (b). A graph shows the strength of the surface plasmonic resonance spectrum peak measured at each position (e).

Not only a thin film aligned perpendicularly to each other can be obtained by continuously changing shear speed, but also a large-area (~2 cm×2 cm) plasmonic thin film can be prepared by coating the plate at a single shear speed (FIG. 5). When there is no linear polarizer, the color of the prepared thin film is slightly bluish due to the color of the gold nanorod (FIG. 5, in (a)), but if the direction of the major axis of the gold nanorod coincides with the direction of linear polarization, the color of the thin film appears green (FIG. 5, in (c)) because light having a wavelength of 660 nm is absorbed in the longitudinal direction of the gold nanorod (FIG. 5, in (c)). If the polarizer is rotated vertically, light having a wavelength of 550 nm is absorbed in the transverse direction of the gold nanorod, thus the color of the thin film appears red (FIG. 5, in (d)).

In order to confirm whether the thin film formed in a large area exhibits a uniform plasmonic effect, nine different positions of the thin film were designated to measure the strength of the plasmonic resonance spectrum peak (FIG. 5, in (e)). In the case of the gold nanorod-DNA thin film which is formed by evaporation of droplets, the strength of the longitudinal SPR peak (blue triangle) was stronger than that of the transverse SPR peak (green inverted triangle), but the strength of two peaks appears weak (FIG. 5, in (e)). However, in the uniaxially aligned film, both peaks exhibited much higher strength than that of the thin film which formed by the evaporation of droplets, and the longitudinal SPR peak was about 1.7 times higher than the transverse SPR peak. At position No. 5 where the thickness of the thin film was relatively thick, the strength of the peak greatly increased as a whole, but the tendency of the strength of the peak was similar at all of nine positions, so it can be appreciated that the thin film formed in the large area had a relatively uniform alignment.

The present invention is a technique for fabricating a nanorods-aligned thin film using a lyotropic liquid crystal as a host material and a nanorod as a guest material. In addition to the nanorods, when a nanomaterial having more than 3 aspect ratios is used, it is possible to prepare a nanomaterial-aligned thin film by elastic interaction with a lyotropic liquid crystal which is a host material.

If a guest material is positioned in a direction in which the angle between the aligned direction of the lyotropic liquid crystal (host material) and guest material increases, the elastic deformation of the lyotropic liquid crystal is induced. As the aspect ratio of the nanomaterial increases, the elastic deformation of the lyotropic liquid crystal increases. In order to avoid this, the angle between the aligned directions of the two nanomaterials (lyotropic liquid crystal and nanomaterial) decreases as the aspect ratio of the nanomaterial increases. Thus, the two nanomaterials are oriented in a direction parallel to each other. That is, as the aspect ratio of the guest material increases, the degree of orientation increases. Accordingly, as a material having a larger aspect ratio than that of the nanorod particle used in the embodiment of the present invention, a nanomaterial having an aspect ratio equal to or larger than 3 may be expected to have the same effect as the nanorods of the present invention.

Accordingly, an aspect of the present invention relates to a method for preparing a coating layer including: (a) injecting composite of nanomaterial and lyotropic liquid crystal to space between an upper plate and a lower plate laminated above and below; and applying a shearing force to the composite of nanomaterial and lyotropic liquid crystal.

In addition, another aspect of the present invention also provides a method for preparing coating layer including: (a) loading composite of nanomaterial and lyotropic liquid crystal to a plate; (b) applying a shearing force by a scrubbing method for sweeping the composite in one-axis using a brush.

According to the present invention, the nanomaterial may be an anisotropic material, which is one or more of the followings:

metal nanorods selected from the group consisting of a gold nanorod, a silver nanorod, a quantum dot nanorod, a zinc oxide nanorod, an aluminum nanorod, a copper nanorod, a lithium nanorod, a palladium nanorod, a platinum nanorod and an alloy nanorod thereof;

carbon materials selected from the group consisting of graphene, graphene oxide, and carbon nanotubes; or metal wires selected from the group consisting of a gold nanowire, a silver nanowire, a copper nanowire, an aluminum nanowire, a platinum nanowire, and a zinc oxide nanowire, but the present invention is not limited thereto.

The lyotropic liquid crystal material may be selected from the group consisting of DNA, cellulose, chitin whisker, collagen, tobacco mosaic virus, and bacteriophage, but is not limited thereto.

According to the present invention, in step (b) the shearing force may be applied by pulling the upper plate or the lower plate to one side at a pulling speed of 1 to 50 μm/s. In order to align the nanomaterial perpendicularly to the pulling direction, it is preferable to apply the shearing force at a pulling speed of 1 to 3 μm/s, and in order to align the nanomaterial in a direction parallel to the pulling direction, it is preferable to apply the shearing force at a pulling speed of 9 to 15 μm/s. In addition, the present invention may apply the shearing force by repeatedly changing the pulling speed to 1 to 3 μm/s and 9 to 15 μm/s so that the nanomaterials are alternately aligned perpendicular and parallel to the pulling direction.

In the present invention, the plate may be a glass or silicon wafer plate, but is not limited thereto.

In the present invention, the width of the plate may be 0.1 to 100 cm$^2$, but is not limited thereto. According to the method of the present invention, the nanomaterials may be uniformly aligned in one direction, especially on a plate having a large area.

According to the present invention, the thickness of the coating layer may be 0.1 to 2 μm, but is not limited thereto.

Meanwhile, a color filter is a key component for realizing colors in a display such as an LCD or an OLED and a CMOS image sensor used in a digital camera or the like. The color filter transmits only light of a specific color among white light, and a plurality of filter regions corresponding to pixels of an image panel are arranged on a plate. Each of the plurality of filter regions has, for example, sub-filter regions of red, green, and blue. The color filter having high color purity and high light transmittance is required in order to realize high quality image in a display device.

Applications of a color filter may be made by using surface plasmon generated in a metal thin film layer forming a nano-sized pattern having periodicity. The surface plasmonic resonance phenomenon serves to allow the metal thin film to absorb light of a specific wavelength band and to change the wavelength band by adjusting the period, size, shape (form) of the pattern, and thickness of the metal thin film or the like. A surface plasmonic color filter using a surface plasmon has a simple structure consisting of a thin film of metals and a dielectric. It provides with clear color by the surface plasmonic resonance phenomenon while overcoming the limit of materials of the color filter based on the conventional pigment or dye.

According to the present invention, a thin film including highly aligned nanomaterials can be prepared by using DNA as a medium in a large area showing surface plasmonic resonance phenomenon. Due to such characteristics, the thin film can be applied to a plasmonic color filter to prepare a high-quality plasmonic color filter film.

Therefore, another aspect of the present invention relates to a plasmonic color filter coated with a coating layer in which the nanomaterials prepared by the preparing method are aligned perpendicularly to the pulling direction.

Another aspect of the present invention relates to a plasmonic color filter coated with a coating layer in which the nanomaterials prepared by the preparing method are aligned parallel to the pulling direction.

Another aspect of the present invention relates to a plasmonic color filter coated with a coating layer in which the nanomaterials prepared by the preparing method are aligned with being alternately aligned perpendicular and parallel to the pulling direction.

Another aspect of the present invention relates to a plasmonic color filter coated with a coating layer in which the nanomaterials prepared by the preparing method are aligned in a zigzag form according to a scrubbing direction.

Another aspect of the present invention relates to a method for controlling an orientation of nanomaterials by applying a shearing force to a composite of a nanomaterial and a lyotropic liquid crystal.

Specifically, the present invention may provide a method for variously controlling an orientation of nanomaterials based on a competition between a shearing force and elasticity of the lyotropic liquid crystal by applying a shearing force to a composite of the nanomaterial and a lyotropic liquid crystal.

According to the present invention, the nanomaterial may be, an anisotropic material which is one or more of the following:

metal nanorods selected from the group consisting of a gold nanorod, a silver nanorod, a quantum dot nanorod, a zinc oxide nanorod, an aluminum nanorod, a copper nanorod, a lithium nanorod, a palladium nanorod, a platinum nanorod and an alloy nanorod thereof;

carbon materials selected from the group consisting of graphene, graphene oxide, and carbon nanotubes; or metal wires selected from the group consisting of a gold nanowire, a silver nanowire, a copper nanowire, an aluminum nanowire, a platinum nanowire, and a zinc oxide nanowire, but the present invention is not limited thereto, and the lyotropic liquid crystal material may be selected from the group consisting of DNA, cellulose, chitin whisker, collagen, tobacco mosaic virus, and bacteriophage, but is not limited thereto.

According to the present invention, the nanomaterials may be aligned perpendicularly to the pulling direction by applying the shearing force to the composite of the nanomaterial and the liquid crystal at the pulling speed of 1 to 3 μm/s, the nanomaterials may be aligned parallel to the pulling direction by applying the shearing force at the pulling speed of 9 to 15 μm/s, and the nanomaterials may be laminated and oriented with being intersected perpendicularly and in parallel to the pulling direction by applying the shearing force while repeatedly changing the pulling speed to 1 to 3 μm/s and 9 to 15 μm/s. The coherent phenomenon of the lyotropic liquid crystal becomes prominent under the designated shear speed range (1 to 50 μm/s). It is difficult to prepare the aligned thin film too fast shear speed over the designated shear speed range because the self-assembly of molecules becomes difficult so, the thin film having a remarkably low degree of orientation is formed. Meanwhile, the nanomaterials may be oriented in the desired direction by applying the shearing force in the designated specific range in the speed range of 1 to 50 μm/s.

According to the present invention, nanomaterials may be aligned in a zigzag form according to a scrubbing direction by applying a shearing force to a composite of a nanomaterial and a lyotropic liquid crystal by a scrubbing method sweeping the composite in one-axis using a brush. An alignment angle in the zigzag form may be preferably ±30 to 50° with respect to the shear direction.

Hereinafter, the present invention will be described in more detail with reference to Examples. These Examples are only for illustrating the present invention and therefore it is apparent to those skilled in the art that the scope of the present invention is not to be constructed as being limited to these Examples.

EXAMPLE

Example 1. Preparation of Gold Nanorod-DNA Composite 1-1. Preparation of DNA

DNA was used as a lyotropic liquid crystal composition to control alignment of gold nanorod structure. DNA extracted from sperm of salmon (Sigma Aldrich, USA), and consisted of a chain having approximately 2000 base pairs and had an average length of approximately 680 nm and a Gaussian distribution along a length of molecules was used. The DNA in the aqueous solution formed a lyotropic liquid crystal state at a high concentration of about 50 mg/ml.

1-2. Preparation of Gold Nanorod

Gold nanorods were synthesized using the most common seed-mediated growth method. The surface of the gold nanorod were modified to methoxy-poly (ethylene glycol) (mPEG-SH, Sigma Aldrich, USA) which can be mixed with the DNA molecules well. Describing the process, first, to reduce the concentration of cetyltrimethylammonium bromide used for growth and stabilization of the metal nanorod, a process of centrifuging 1 ml of a gold nanorod solution at 9000 rpm for 20 minutes and remove a supernatant and then dispersing it in water was repeated twice. Thereafter, 250 μl of a 6 kDa mPEG-SH aqueous solution having a concentration of 2 mM was added in the gold nanorod aqueous solution which is re-dispersed after removing the centrifuged supernatant. The composite was gently agitated for 24 hours, and then remaining excessive mPEG-SH was removed by a centrifugation.

1.3. Preparation of Composite of DNA and Gold Nanorod

Initial DNA concentration was set to Ci=50 mg/ml and added to 1 wt % of gold nanorod solution in which the gold nanorod is surface-modified with the polyethylene glycol (PEG) at a concentration of 5 wt % without further purification, and then dissolved by being agitated for several hours (FIG. 1).

Example 2. Preparation of Unidirectionally Aligned Gold Nanorod-DNA Thin Film 2-1. Uniaxial Alignment Induction of Gold Nanorod-DNA Thin Film After a cleaned glass plate was prepared, the gold nanorod-DNA composite prepared in the above Example 1 was dropped on the glass plate in droplets and the droplets were evaporated to form a thin film (control group). On the other hand, two cleaned glass plates were laminated to form a sandwich cell, the gold nanorod-DNA composite prepared in the above Example 1 was injected in the cell, and then a shear coating method pulling the upper plate in one direction is used to form a thin film. The temperature of the plate was maintained at 25° C., the speed at which the upper plate was pulled was in the range of 1 to 50 μm/s, and a shearing force was applied at 1 μm/s in a slow coating, and 10 μm/s in a fast coating. After the coating, the solvent (water) was completely evaporated to prepare a gold nanorod-DNA thin film having a thickness of approximately 1 to 0.5 μm 2-2. Confirmation of Alignment of Gold Nanorod-DNA Thin Film The orientation of molecules in the gold nanorod-DNA thin film which is subjected to a shear coating with different shearing force and the orientation of molecules in the gold nanorod-DNA thin film which is made by the evaporation of droplets were analyzed by a microscope and a spectrometer, respectively.

2-2-1. Confirmation of Orientation of DNA Molecules

The orientation of the DNA molecules was analyzed by a polarizing microscope (LV 100-POL, Nikon), in which two polarizers (polarizer and analyzer) are orthogonal to each other, in which a retardation plate ($\lambda$=530 nm) is inserted.

A domain in which orange and blue colors are mixed was confirmed in the thin film formed by the evaporation of droplets (FIG. 3A). This showed that the gold nanorods-DNA molecules have some domains aligned in a small area but have random orientation as a whole. On the other hand, in the thin film prepared by the shear coating at a slow speed or a fast speed, a uniform yellow (FIG. 3, in (e)) or blue (FIG. 3, in (i)) was observed by the polarizing microscope. Thus, it could be appreciated that in the thin film formed by the slow shear speed, the DNA chain is aligned perpendicularly to the shear direction and in the thin film formed by the fast shear speed, the DNA chain was aligned parallel to the shear direction.

2-2-2. Confirmation of Alignment of Gold Nanorods

The alignment of the gold nanorods was analyzed by observing extinction color of the thin film according to the direction of the polarization, by changing an angle between the shear direction and the linear polarization by rotating the polarizer in the microscope in which one linear polarizer is inserted. In surface plasmonic resonance spectrum of the thin film, absorption spectrum was measured using a spectrometer (USB-2000+, Ocean Optics) by rotating a sample of the thin film using a light source (SPECTRA X, Lumencor) in visible light region.

In the thin film formed by the evaporation of droplets, change in an extinction color was observed as the polarizer was rotated, but various colors appear mixed, so that it could be appreciated that the gold nanorods were aligned in a small area like the DNA chain but have a random alignment as a whole (FIG. 3, in (b) and (c)). If surface plasmonic resonance spectrum of this thin film is confirmed by the spectrometer, the longitudinal SPR peak of the gold nanorod was observed at 660 nm, the transverse SPR peak of the gold nanorod was observed at 550 nm, and the strength of each peak was not greatly changed in the direction of the linear polarization (FIG. 3, in (d)).

Meanwhile, in the thin film coated at the slow shear speed, a green color appears when a direction of the linear polarizer is perpendicular to the shear direction (FIG. 3, in (f)), a red color appears when a direction of the linear polarizer is parallel to the shear direction (FIG. 3, in (g)), so that it could be appreciated that like the DNA chain, the gold nanorods were also aligned perpendicular to the shear direction. The plasmonic resonance spectra of the thin film coated at the slow shear speed showed the longitudinal and transverse SPR peaks similar to the randomly aligned thin film, and the strength of the peaks was greatly changed in the linear polarization direction (FIG. 3, in (h)). For example, when the angle between the linear polarization direction and the shear direction is 0°, the strength of the transverse SPR peak was strong, and when the angle between the linear polarization direction and the shear direction is 90°, the strength of the longitudinal SPR peak become the maximum.

The thin film coated at the fast shear speed showed the extinction color opposite to the thin film coated at the slow shear speed (FIG. 3, in (j) and (k)), so that it could be appreciated that the gold nanorods were aligned parallel to the shear direction. In contrast to the plasmonic resonance spectrum of the thin film coated at the slow shear speed, in the plasmonic resonance spectrum of the thin film coated at the fast shear speed, the strength of the longitudinal peak become the maximum when an angle between the linear polarization direction and the shear direction is 0° and the strength of the longitudinal SPR peak become the minimum when an angle between the linear polarization direction and the shear direction is 90° (FIG. 3, in (l)).

Example 3. Preparation of Modified Gold Nanorod-DNA Thin Film 3-1. Induction of Gold Nanorod-DNA Thin Film Alignment Using Scrubbing Method In Example 2, an alignment of the gold nanorod-DNA thin film was induced with a shear flow induction method by pulling the upper plate. Hereinafter, a gold nanorod-DNA alignment was induced by scrubbing with a brush. After a cleaned glass plate was prepared, the gold nanorod-DNA composite prepared in the above Example 1 was dropped on the glass plate and the gold nanorod-DNA composite was scrubbed with a cosmetic brush (Olive Young, Shadow Brush #6, Korea).

3-2. Confirmation of Alignment of Gold Nanorod-DNA Thin Film

Figure 2:
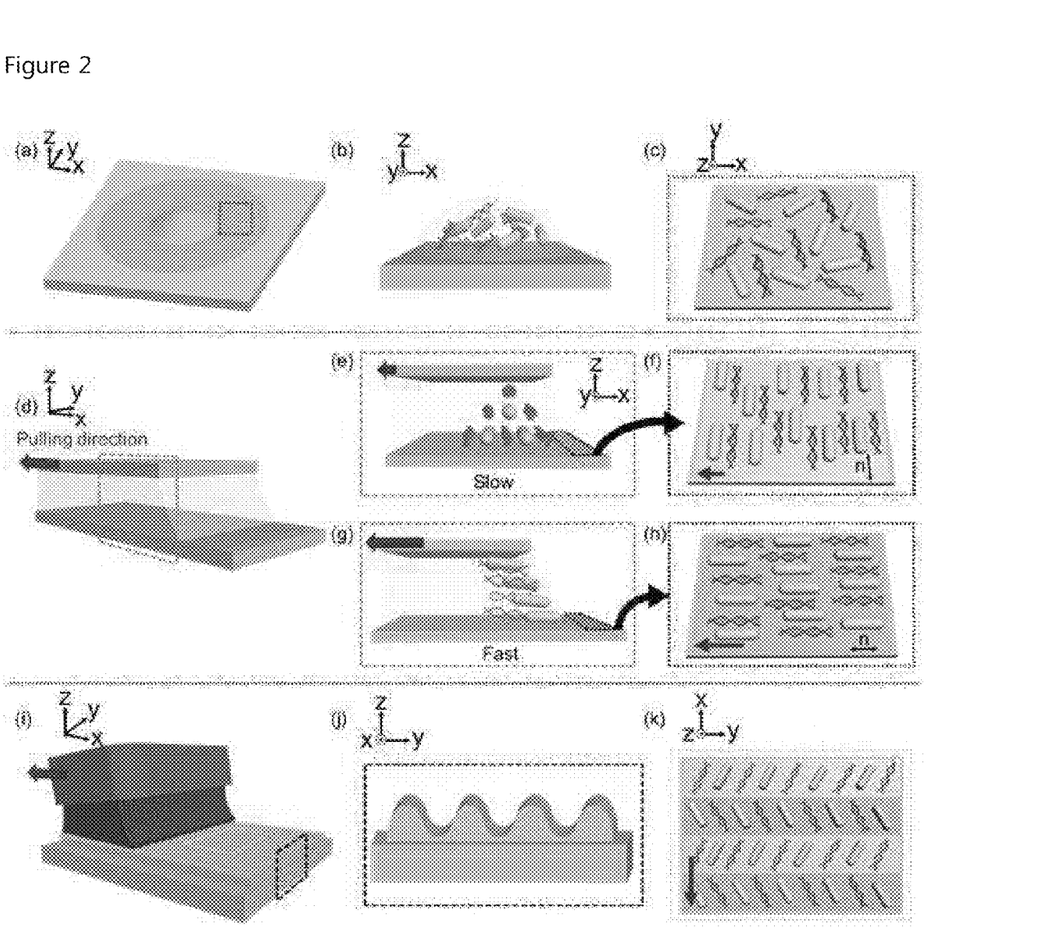
FIG. 2 is a schematic diagram showing an alignment according to a method for forming a thin film of a gold nanorod-DNA composite on a glass plate. By forming droplets of the gold nanorod-DNA composite on a substrate (a) and then evaporating a solvent (water), the gold nanorod and the DNA in the formed thin film have a relatively random orientation (b, c). On the other hand, in the case of using a shear coating method for performing coating by a shearing force applied in one direction (d), if a coating speed is slow, the gold nanorod and the DNA are oriented in a direction perpendicular to a pulling direction (e, f), and if the coating speed is fast, the gold nanorod and the DNA are oriented in a parallel direction (g, h). When the thin film is prepared by a scrubbing method for applying a shearing force using a brush rather than a flat plate (i), the DNA-gold nanorod domain, which is deformed to have a zigzag form in a scrubbing direction during a process of inducing micro-scale grooves and ridges and evaporating a solvent (j, k), is formed.

The gold nanorod-DNA thin film prepared by the scrubbing method induced micron-scale grooves and ridges unlike a flat film prepared by the shear flow induction method (FIG. 2, in (j)). In the initial state, the DNA of the scrubbed film was aligned parallel to the scrubbed direction, but it was confirmed that the DNA chain is expanded during the evaporation of the solvent (water) and the DNA-gold nanorod domain deformed in a zigzag form according to the scrubbing direction appears (FIG. 2, in (k)).

Example 4. Preparation of Orthogonally Aligned Gold Nanorod-DNA Thin Film 4-1. Orthogonally Aligned Induction of Gold Nanorod-DNA Thin Film Two glass plates were sandwhiched, and the gold nanorod-DNA composite of the above Example 1 was injected between them. Thereafter, the upper plate was subjected to the shear coating while being pulled by continuously changing the shear speed of the upper plate to a slow speed (about 1 μm/s) and a fast speed (about 10 μm/s).

4-2. Confirmation of Alignment of Gold Nanorod-DNA Thin Film

The thin film formed in the above Example 4-1 was observed by a polarizing microscope in which a retardation plate is inserted. When the shear direction of the sample and the optic axis of the retardation plate were orthogonal to each other, continuous yellow-blue stripes was observed. If the sample is rotated so that the shear direction of the sample and the optic axis of the film was parallel to each other, the colors of each domain appeared reversed (FIG. 4, in (b)). By observing extinction color of the thin film using a microscope in which only one polarizer is inserted, the extinction color of a part formed at the slow shear speed was green, the extinction color of a part formed at the fast shear speed was red when the linear polarization direction is perpendicular to the shear direction (FIG. 4, in (c)), and the extinction color appeared reversed when the polarizer is rotated parallel to the shear direction (FIG. 4, in (d)).

Example 5. Preparation of Unidirectionally Aligned Large-Area Plasmonic Thin Film It was confirmed that it is possible to prepare nanomaterials film oriented unidirectionally in a large area by the shear flow induction method. Two glass plates (about 2×2 cm) having a large area were laminated. The gold nanorod-DNA composite was injected therebetween, and then the upper plate was pulled at a constant shear speed. The prepared thin film was slightly bluish due to the color of the gold nanorod when there is no linear polarizer (FIG. 5, in (a)). However, if the direction of the major axis of the gold nanorod coincides with the direction of linear polarization, the thin film appeared green (FIG. 5, in (c)) due to light having a wavelength of 660 nm is absorbed (FIG. 5, in (c)). If the polarizer is rotated vertically, light having a wavelength of 550 nm was absorbed in the transverse direction of the gold nanorod, thus the thin film appears red (FIG. 5, in (d)).

In order to confirm whether the thin film formed in a large area exhibits a uniform plasmonic effect, nine different positions of the thin film were designated (FIG. 5, in (b)) to measure the strength of the plasmonic resonance spectrum peak (FIG. 5, in (e)). In the thin film formed by the evaporation of droplets, the strength of the longitudinal SPR peak (blue triangle) appeared stronger than that of the transverse SPR peak (green inverted triangle), but the strength of both peaks appeared very weak as a whole (FIG. 5, in (e)). However, in the thin film aligned by the shearing force, both SPR peaks showed stronger strength than the peak of the randomly aligned thin film, and the longitudinal SPR peak was about 1.7 times higher than the transverse SPR peak. In the case of position No. 5 where the thickness of the thin film is relatively thick, the strength of the peak greatly increases as a whole, but the tendency of the strength of each peak appeared similarly in all nine locations, which showed that the thin film formed in the large area has a relatively uniform alignment. From these results, the present invention was confirmed that a thin film showing surface plasmonic resonance phenomenon can be prepared in a large area using DNA as a medium.

Hereinabove, the specific portion of the present invention is specifically described but it is apparent to those skilled in the art that the detailed description is only a preferable embodiment and does not limit the scope of the present invention. Therefore, the substantial scope of the present invention is defined by the appending claims and equivalents thereto.

What is claimed is:

1. A method for preparing a coating layer, comprising:
  (a) injecting a composite of nanomaterial and lyotropic liquid crystal into a space between an upper plate and a lower plate in a laminate; and
  (b) applying a shearing force to the composite of nanomaterial and lyotropic liquid crystal, wherein
the shearing force is applied by repeatedly changing the pulling speed to 1 to 3 μm/s and 9 to 15 μm/s so that the nanomaterial is alternately aligned perpendicular and parallel to the pulling direction.

2. The method of claim 1, wherein the nanomaterial is an anisotropic material, which is one or more selected from:
metal nanorods selected from the group consisting of a gold nanorod, a silver nanorod, a quantum dot nanorod, a zinc oxide nanorod, an aluminum nanorod, a copper nanorod, a lithium nanorod, a palladium nanorod, a platinum nanorod and an alloy nanorod thereof;
carbon materials selected from the group consisting of graphene, graphene oxide, and carbon nanotubes; or
metal wires selected from the group consisting of a gold nanowire, a silver nanowire, a copper nanowire, an aluminum nanowire, a platinum nanowire, and a zinc oxide nanowire.

3. The method of claim 1, wherein the lyotropic liquid crystal is selected from the group consisting of DNA, cellulose, chitin whisker, collagen, tobacco mosaic virus, and bacteriophage.

\* \* \* \* \*